(12) United States Patent
Trease

(10) Patent No.: US 8,266,038 B2
(45) Date of Patent: Sep. 11, 2012

(54) METHODS, SYSTEMS, AND COMPUTER PROGRAM PRODUCTS FOR PROVIDING LOW RISK PORTABLE ALPHA INVESTMENT INSTRUMENTS

(75) Inventor: Scott Patrick Trease, Waxhaw, NC (US)

(73) Assignee: Sapere IP, LLC, Matthews, NC (US)

( * ) Notice: Subject to any disclaimer, the term of this patent is extended or adjusted under 35 U.S.C. 154(b) by 0 days.

(21) Appl. No.: 13/239,911

(22) Filed: Sep. 22, 2011

(65) Prior Publication Data

US 2012/0016787 A1 Jan. 19, 2012

Related U.S. Application Data

(62) Division of application No. 11/946,429, filed on Nov. 28, 2007, now Pat. No. 8,046,285.

(51) Int. Cl.
*G06Q 40/00* (2012.01)
(52) U.S. Cl. .......................... 705/36 R; 705/37
(58) Field of Classification Search .................. None
See application file for complete search history.

(56) References Cited

U.S. PATENT DOCUMENTS

| | | | | |
|---|---|---|---|---|
| 5,784,696 | A * | 7/1998 | Melnikoff | 705/36 R |
| 6,021,397 | A * | 2/2000 | Jones et al. | 705/36 R |
| 6,275,814 | B1 * | 8/2001 | Giansante et al. | 705/36 R |
| 7,016,870 | B1 * | 3/2006 | Jones et al. | 705/35 |
| 7,222,093 | B2 * | 5/2007 | Block et al. | 705/35 |
| 7,668,773 | B1 * | 2/2010 | Pruitt | 705/36 T |
| 7,689,493 | B1 * | 3/2010 | Sullivan et al. | 705/36 R |
| 7,831,495 | B1 * | 11/2010 | Wester | 705/36 R |
| 2002/0019793 | A1 * | 2/2002 | Frattalone | 705/36 |
| 2003/0144947 | A1 * | 7/2003 | Payne | 705/37 |
| 2004/0103052 | A1 * | 5/2004 | Eapen | 705/36 |
| 2005/0010510 | A1 * | 1/2005 | Brose et al. | 705/35 |
| 2007/0156555 | A1 * | 7/2007 | Orr | 705/35 |
| 2007/0271166 | A1 * | 11/2007 | Boone et al. | 705/36 R |
| 2008/0091622 | A1 * | 4/2008 | Yass et al. | 705/36 R |
| 2009/0006270 | A1 * | 1/2009 | Penello | 705/36 R |
| 2011/0078070 | A1 * | 3/2011 | Barker et al. | 705/37 |

FOREIGN PATENT DOCUMENTS

WO WO 96/06402 * 2/1996

OTHER PUBLICATIONS

Hoenig, The Diversification Delusion, smartmoney.com/investing/stocks/the-diversification-delusion-10443/?print-=1, © Apr. 26, 2001.*

Hoenig Jonathan, The Diversification Delusion, smartmoney.com/investing/stocks/the-diversification-delusion-10443/?print-=1, © Apr. 26, 2001.*

* cited by examiner

*Primary Examiner* — Robert R Niquette
(74) *Attorney, Agent, or Firm* — Myers Bigel Sibley & Sajovec

(57) ABSTRACT

Provided are methods of providing a portable alpha investment instrument. Some embodiments of such methods include allocating a first portion of a financial asset to a first asset class, allocating a second portion of the financial asset to a second asset class, establishing a swap transaction corresponding to the first portion of the financial asset, the swap transaction configured to define a minimum term corresponding to an asset status change, and transferring the first portion and the second portion of the financial asset responsive to the allocating.

9 Claims, 4 Drawing Sheets

METHODS, SYSTEMS, AND COMPUTER PROGRAM PRODUCTS FOR PROVIDING LOW RISK PORTABLE ALPHA INVESTMENT INSTRUMENTS

RELATED APPLICATIONS

This U.S. non-provisional patent application claims priority under 35 U.S.C. §120 as a divisional of U.S. patent application Ser. No. 11/946,429, filed Nov. 28, 2007 now U.S. Pat. No. 8,046,285, the disclosure of which is hereby incorporated herein by reference in its entirety.

FIELD OF THE INVENTION

The present invention relates to commercial applications and, more particularly, to methods, systems and computer program products related to investment instruments.

BACKGROUND

The investment industry has generated a variety of investment solutions for improving returns to investors while reducing potential downside risks. One such solution includes strategies referred to as portable alpha solutions. A portable alpha solution is an investment technique that may combine two independent return streams. One of the return streams may be attributed to some type of market exposure (beta) and one of the return streams may be attributed to investment manager's deliberate exploitation of market inefficiency (alpha). Reference is now made to FIG. 1, which is a flow diagram illustrating conventional operations for providing a portable alpha fund. As illustrated a total portfolio return 14 may include a market return (beta) 10 and an excess return (alpha) 12. In this manner, an investor may realize gains that exceed market return by virtue of an investment manager's skills.

Reference is now made to FIG. 2, which is a flow diagram illustrating transactions corresponding to a conventional portable alpha fund. An investor 20 invests in the portable alpha fund 22. To acquire a beta return stream, the portable alpha fund 22 purchases exposure to a market index from a bank 24 or other financial institution. In exchange for receiving index returns from the bank 24, a portable alpha fund 22 pays the bank 24 an interest rate, such as the London Interbank Offered Rate (LIBOR), plus a spread, which may represent a profit source for the bank 24. The exposure to a market index purchased from the bank 24 may be leveraged such that only a fraction of the amount of exposure purchased is required for the purchase. For example, futures contracts and/or options on a market index may be purchased in lieu of or in addition to purchasing shares of an index fund. In this manner, the portable alpha fund 22 acquires a beta return stream. An alpha return stream may be acquired by the portable alpha fund 22 through a purchase of shares in a hedge fund 26. Conventional portable alpha strategies may experience limited effectiveness using conventional approaches.

SUMMARY

Embodiments of the present invention are directed to methods for providing a portable alpha investment instrument. Some embodiments of such methods include allocating a first portion of a financial asset to a first asset class, allocating a second portion of the financial asset to a second asset class, establishing a swap transaction corresponding to the first portion of the financial asset, the swap transaction configured to define a minimum term corresponding to an asset status change, and transferring the first portion and the second portion of the financial asset responsive to the allocating. In some embodiments, the first portion and/or the second portion may be transferred to one or more accounts corresponding to one or more investment banks, among others.

In some embodiments, the first asset class includes a composite index corresponding to multiple securities. In some embodiments, the securities are selected using fundamental value methods. In some embodiments, allocating the first portion includes purchasing a leveraged position of the composite index via a derivative instrument of the composite index.

In some embodiments, allocating the second portion includes purchasing shares in multiple time-value-based securities. In some embodiments, the time-value-based securities include financial and/or commodity derivatives selected by at least one commodity trading advisor and/or managed futures trader.

In some embodiments, establishing the swap transaction includes exchanging a first return corresponding to a first term for a second return corresponding to a second term, wherein the first term is substantially shorter than the second term. In some embodiments, the asset status change includes a tax status change corresponding to a change from a combined short term capital gain and long term capital gain tax liability to an exclusively long term capital gain tax liability.

In some embodiments, establishing the swap includes establishing multiple fractional swaps, wherein any of the fractional swaps may be terminated prior to the asset status change. In some embodiments, the second asset class performs with a negative correlation relative to a performance of the first asset class. In some embodiments, a performance of the second asset class is substantially uncorrelated with a performance of the first asset class.

Some embodiments include a computer program product, the computer program product including a computer usable storage medium having computer-readable program code embodied in the medium, the computer readable program code configured to perform allocating a first portion of a financial asset to a first asset class and allocating a second portion of the financial asset to a second asset class. Some embodiments of the computer readable program code may be configured to perform establishing a swap transaction corresponding to the first portion of the financial asset, the swap transaction configured to define a minimum term corresponding to an asset status change and transferring the first portion and the second portion of the financial asset responsive to the allocating.

Some embodiments of the present invention include a system for investing in multiple asset classes. Some embodiments of such a system may include a beta asset selector that is configured to select a beta asset class, an alpha asset selector that is configured to select an alpha asset class that is different from the beta asset class, and a term converter that is configured to convert a first term corresponding to the beta asset into a second term corresponding to the beta asset class.

In some embodiments, the alpha selector is configured to select the alpha asset class that includes a negative market movement correlation relative to the beta asset class. In some embodiments, the alpha selector is configured to select the alpha asset class that includes uncorrelated market movement relative to the beta asset class.

In some embodiments, the beta asset class includes a composite stock index and the alpha asset class includes managed futures and/or a commodity index corresponding to multiple time-value-based securities. In some embodiments, the beta asset class includes a RAFI™ index and the alpha asset class includes a commodity trading advisor fund. In some embodiments, the term converter is further configured to establish a swap transaction of a first beta asset class return corresponding to the first term for a second beta asset class corresponding to the second term, such that the first term is substantially shorter than the second term.

In some embodiments, the swap transaction includes a rolling swap transaction, that includes multiple fractional swap transactions such that any of the fractional swap transactions may be terminated prior to the contract term without affecting the other of the plurality of the fractional swap transactions.

In some embodiments, the term converter is further configured to convert a first volatility of alpha asset class return corresponding to the first term to a second volatility of alpha asset class corresponding to the second term and the first term is substantially shorter than the second term. In some embodiments, the second term is sufficiently long to cause a tax status change.

DETAILED DESCRIPTION OF EMBODIMENTS OF THE INVENTION

Figure 1:
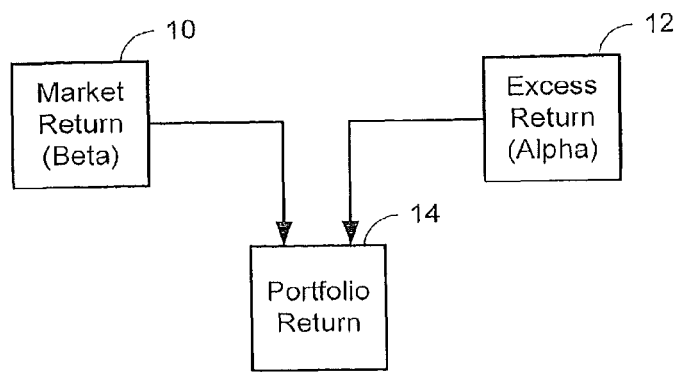
FIG. 1 is a flow diagram illustrating conventional operations for providing a portable alpha fund.
Figure 2:
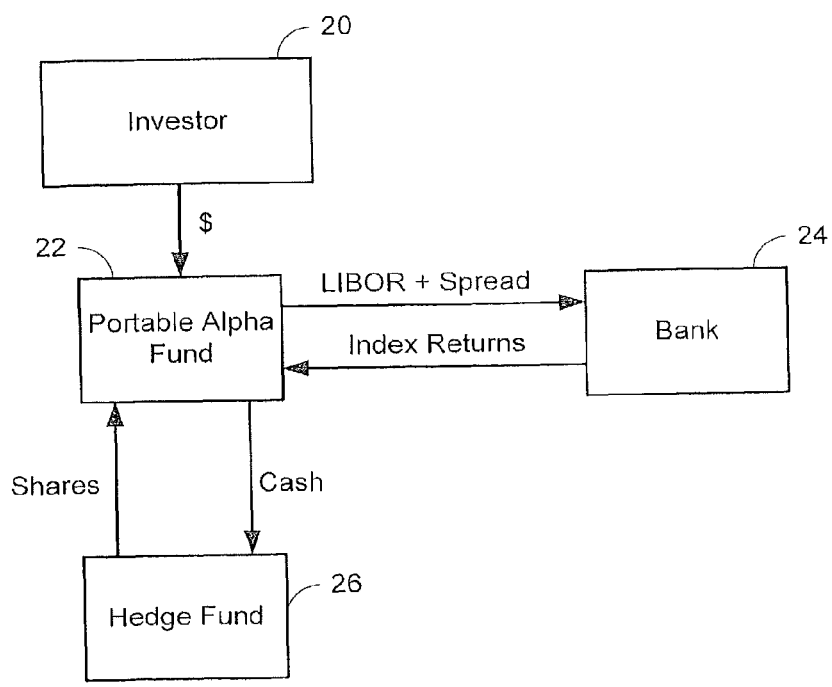
FIG. 2 is a flow diagram illustrating transactions corresponding to a conventional portable alpha fund.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Well-known functions or constructions may not be described in detail for brevity and/or clarity.

The present invention may be embodied as methods, systems, and/or computer program products. Accordingly, the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

Embodiments of the invention herein may be generally directed to systems, methods and computer program products for investing in multiple asset classes and/or providing portable alpha investment instruments. For example, improved investment performance may be realized by selecting uncorrelated and/or unconventional asset classes and establishing a tax favorable swap transaction.

Figure 3:
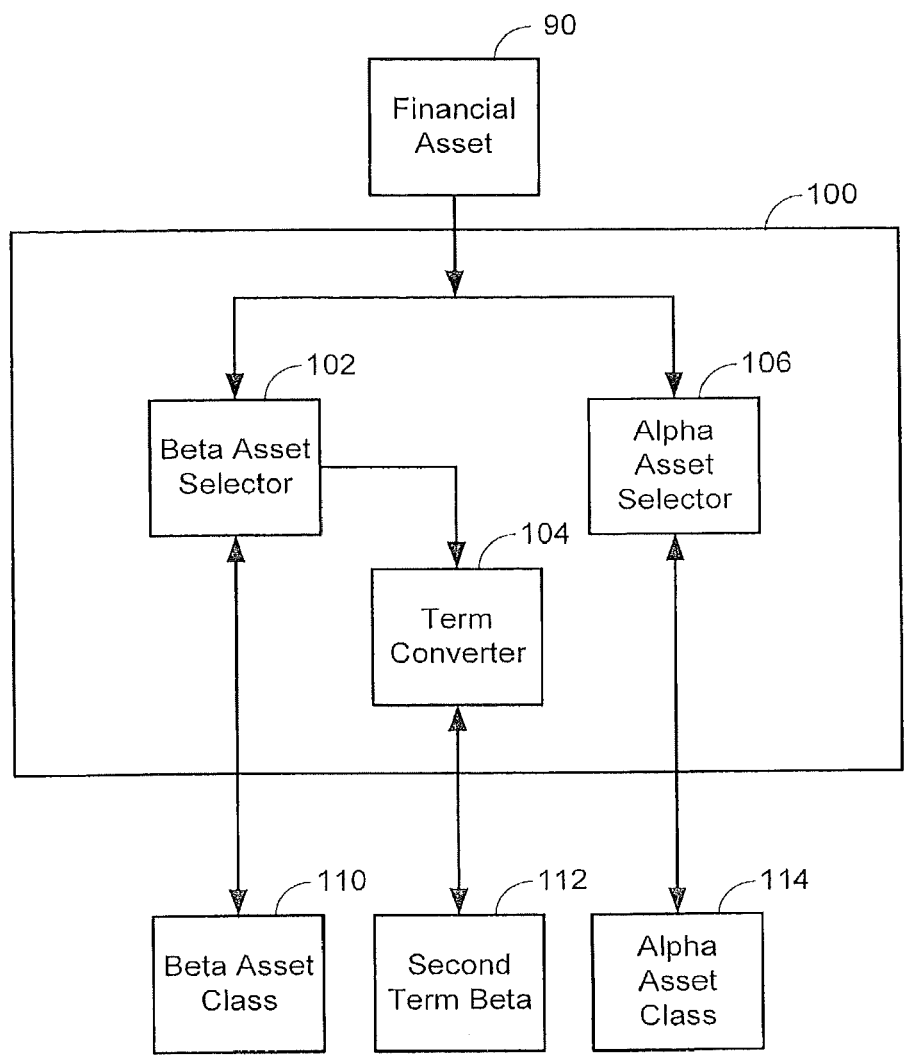
FIG. 3 is a flow diagram illustrating a system for investing in multiple asset classes according to some embodiments of the present invention.

Reference is now made to FIG. 3, which is a flow diagram illustrating a system 100 for investing in multiple asset classes according to some embodiments of the present invention. The illustrated system 100 receives a financial asset 90 from an investor. The system 100 includes a beta asset selector 102 that is configured to select a beta asset class 110. In some embodiments, the beta asset class 110 includes a composite stock index. For example some embodiments provide that the beta asset class 110 includes an index based on fundamental analysis such as, for example, Research Affiliates Fundamental Index (RAFI). In contrast with capitalization weighted market indices, which may select stocks based on market capitalization, fundamentally based indices are indices in which stocks are weighted by a fundamental factor (e.g., sales, book value, dividends) and/or a composite of fundamental factors. By using fundamentally based indices, pitfalls that may be associated with capitalization weighted indices such as, for example, overweighting overvalued stocks and underweighting undervalued stocks, may be avoided.

The system 100 includes an alpha asset selector 106 that is configured to select an alpha asset class 114. In some embodiments, the alpha asset selector 106 may be configured to select an alpha asset class 114 that includes a negative market movement correlation relative to the beta asset class 110. In some embodiments, the alpha asset selector 106 may be configured to select the alpha asset class 114 that includes uncorrelated market movement relative to the market movement of the beta asset class 110.

In some embodiments, the alpha asset class 114 may include managed futures and/or a commodity index corresponding to multiple time-value-based securities. For example, some embodiments may provide that the alpha asset class 114 includes a commodity trading advisor (CTA) fund. A CTA fund may include a fund in which one or more fund managers receive compensation for trading a managed futures and/or options account. Futures and options may be described as time value based securities that are derivatives of a commodity, currency, and/or composite index, among others.

Some embodiments of the system 100 may include a term converter 104 that is configured to convert a first-term corresponding to the beta asset class 110 into a second term corresponding to the beta asset class 110. In this manner, a second term beta 112 may be received in the system 100. In some embodiments, the term converter 104 may be configured to establish a swap transaction of a first beta asset class return corresponding to the first term for second beta asset class corresponding to the second term. Some embodiments provide that the first term may be substantially shorter than the second term.

By way of example, the swap transaction may include contracting with a large investment bank that will, on behalf of the system 100, purchase and hold positions corresponding to all of the securities in one or more specific composite indices in the correct weights. In some embodiments, the composite index securities are leveraged through, for example, futures and/or options, among others. In exchange for holding the securities, the system 100 may provide collateral in the form of a relatively stable securities such as, for example, bonds, treasury bills, cash and/or money market shares. The system 100 may pay the investment bank monthly interest payments over the term of the contract. In some embodiments, the system 100 may provide additional capital to meet margin requirements corresponding to negative changes in the value of the composite index securities. At the end of the contract term, the investment bank pays the system 100 corresponding to any increase in value of the composite index securities.

In some embodiments, the second term may be sufficiently long so as to shift a tax status from short term capital gains to long term capital gains, which may be taxed at a lower tax rate. For example, in some embodiments, the second term may be greater than twelve months.

In some embodiments, the swap transaction includes a rolling swap transaction. For example, the swap transaction may include multiple fractional swap transactions such that any of the fractional swap transactions may be terminated prior to the contract term without affecting the other fractional swap transactions. A rolling swap may provide flexibility to address liquidity shortfalls that may occur during the second term. In this regard, if one of the fractional swap transactions is terminated prematurely, the tax status change may be unavailable for that fractional swap transaction without affecting the tax status change corresponding to the other of the fractional swap transactions.

In some embodiments, the term converter 104 may be further configured to convert a first term alpha asset class return corresponding to the first term into a second term alpha asset class corresponding to the second term that is shorter than the first term. In this regard, the alpha asset class transactions may change status regarding income classification for income tax purposes.

Figure 4:
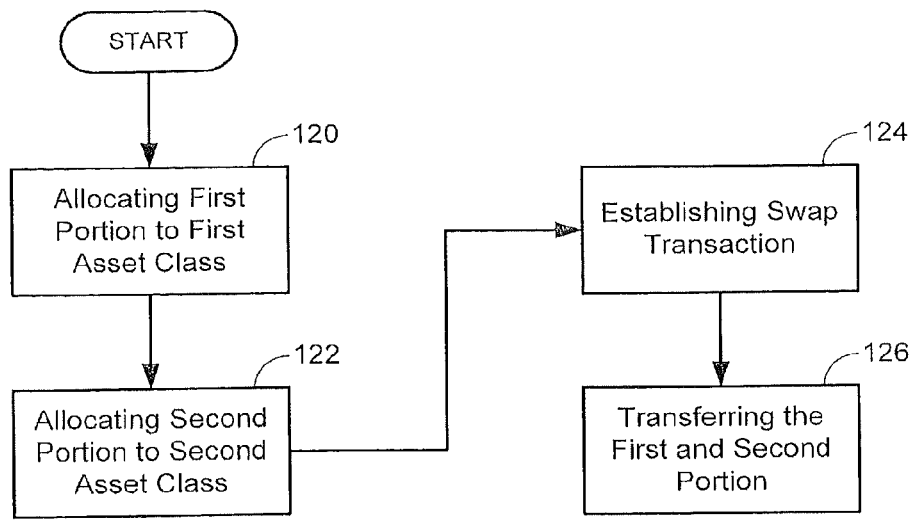
FIG. 4 is a block diagram illustrating operations for providing a portable alpha investment instrument according to some embodiments of the present invention.

Reference is now made to FIG. 4, which is a block diagram illustrating operations for providing a portable alpha investment instrument according to some embodiments of the present invention. Some embodiments provide that the first portion of a financial asset is allocated to a first asset class (block 120). In some embodiments the first asset class includes a composite index corresponding to multiple securities. Examples of composite indices include the Dow Jones Industrial Average (DJIA), Standard and Poor's 500 (S&P 500), New York Stock Exchange composite index (NYSE), and the Research Affiliates Fundamental Index 1000 (RAFI), among others.

In some embodiments, securities selected corresponding to the composite index may be selected using fundamental value methods. In contrast with capitalization weighted market indices, which may select stocks based on market capitalization, fundamental value indices may select securities based on fundamental values such as, for example, sales, book value, and/or dividends, among others. By using fundamentally based indices, pitfalls that may be associated with capitalization weighted market indices such as, for example, over-weighting overvalued stocks and underweighting undervalued stocks, may be avoided.

In some embodiments, allocating the first portion of the financial asset may include purchasing one or more leveraged positions of the composite index using derivative instruments of the composite index. Examples of derivative instruments include, but are not limited to, futures contracts and/or options, among others.

Some embodiments may include allocating a second portion of the financial asset to a second asset class (block 122). In some embodiments, allocating the second portion includes purchasing shares in multiple time-value-based securities. In some embodiments, the time-value-based securities may include one or more commodity derivatives that may be selected by at least one commodity trading advisor and/or managed futures trader. In some embodiments, the commodity derivatives may include derivatives of one or more commodities, currencies, and/or composite indices, among others.

In some embodiments, the second asset class may perform with a negative correlation relative to a performance of the first asset class. In some embodiments, the performance of the second asset class may be substantially uncorrelated with the performance of the first asset class. By providing negatively and/or uncorrelated asset classes, overall risk of loss due to poor market performance may be reduced.

In some embodiments, providing a portable alpha investment instrument may also include establishing a swap transaction corresponding to the first portion of the financial asset (block 124). In some embodiments, the swap transaction may be configured to define a minimum term corresponding to an asset status change. In some embodiments, establishing the swap transaction may include exchanging a first return corresponding to a first term for a second return corresponding to a second term such that the first term may be substantially shorter than the second term. For example, in some embodiments, an asset status change includes a tax status change corresponding to a change from a combined short term capital gain and a long term capital gain tax liability to an exclusively long term capital gain tax liability.

In some embodiments, establishing the swap transaction includes establishing multiple fractional swap transactions such that any of the fractional swap transactions may be terminated prior to the asset status change. In this regard, an early termination of one of the fractional swap transactions may occur prior to the asset status change regarding the terminated fractional swap transaction without affecting the asset status change of the other fractional swap transactions.

In some embodiments, establishing the swap transaction may include establishing a rolling swap transaction that may include multiple fractional swap transactions that are temporally delayed and/or staggered regarding initiation and/or termination. In this regard, flexibility to respond to changing market conditions such as, for example, interest rates and/or composite index performances may be increased. For example, multiple swap transactions that terminate at quarterly intervals relative to one another may be utilized instead of single and/or multiple swap transactions that occur simultaneously.

In some embodiments, operations for providing a portable alpha investment instrument may include transferring the first portion of the financial asset and the second portion of the financial asset responsive to allocations determined herein (block 126). For example, some embodiments may provide for transferring funds and/or collateral into accounts, to investment banks, fund managers, investment accounts, and/or holding accounts, among others.

Figure 5:
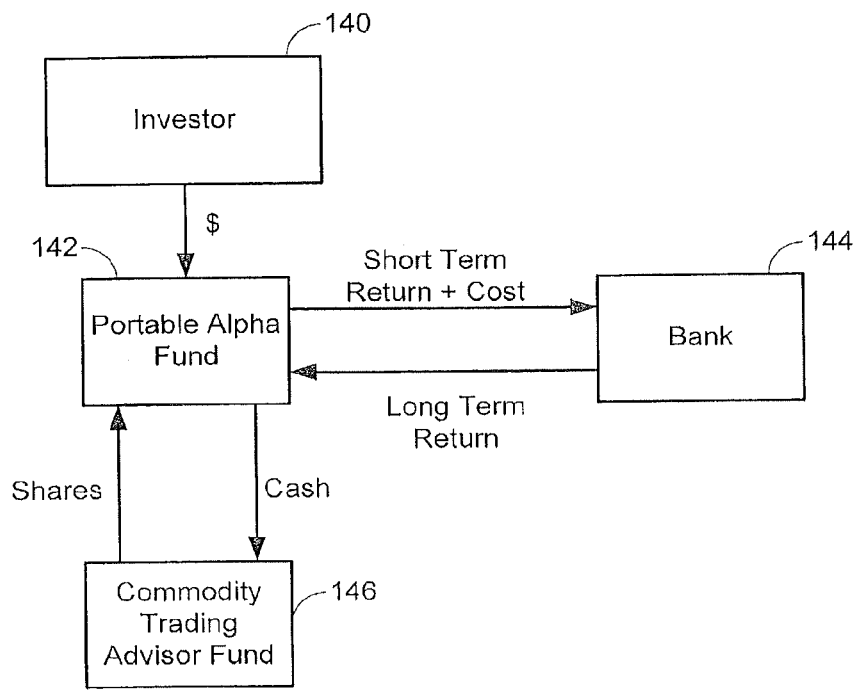
FIG. 5 is a flow diagram illustrating transactions corresponding to a portable alpha investment according to some embodiments of the present invention.

Reference is now made to FIG. 5, which is a flow diagram illustrating transactions corresponding to a portable alpha investment according to some embodiments of the present invention. An investor 140 invests in the portable alpha fund 142. To acquire a beta return stream, the portable alpha fund 142 purchases exposure to a market index from a bank 144 or other financial institution. In exchange for receiving long term returns corresponding to the market index, a portable alpha fund 142 may pay the bank 24 a short term return plus an additional transaction cost. In some embodiments, the short term return may be determined by an index and/or institutionalized interest rate, such as, for example, the LIBOR. In some embodiments, the long term return may be leveraged such that only a fraction of the amount of exposure purchased is required for the purchase and/or collateral. For example, futures contracts and/or options on a market index may be purchased in lieu of or in addition to purchasing shares of an index fund. In this manner, the portable alpha fund 142 acquires a beta return stream. An alpha return stream may be acquired by the portable alpha fund 142 through a purchase of shares of a commodity trading advisor and/or managed futures fund 146.

In some embodiments, the market exposure corresponding to the beta return stream may be leveraged such that only a percentage of the total investment is required to obtain exposure equal to the total investment. The remaining portion of the investment may be used to buy into the alpha revenue stream.

Figure 6:
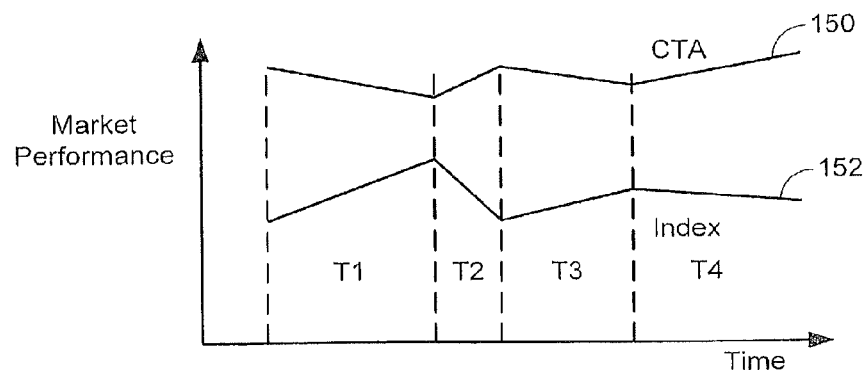
FIG. 6 is a graph illustrating negatively correlated first and second asset classes in a portable alpha investment instrument according to some embodiments of the present invention.

Brief reference is now made to FIG. 6, which is a graph illustrating negatively correlated first and second asset classes in a portable alpha investment instrument according to some embodiments of the present invention. As illustrated, the market performance of a CTA 150 may be negatively correlated to that of a composite index 152. For example, during the time period defined as T1, the composite index 152 exhibits a positive performance and the CTA 150 exhibits a negative performance. Similar observations regarding divergent market performance associated with a negative correlation in time periods T2, T3 and T4 are thus illustrated.

Figure 7:
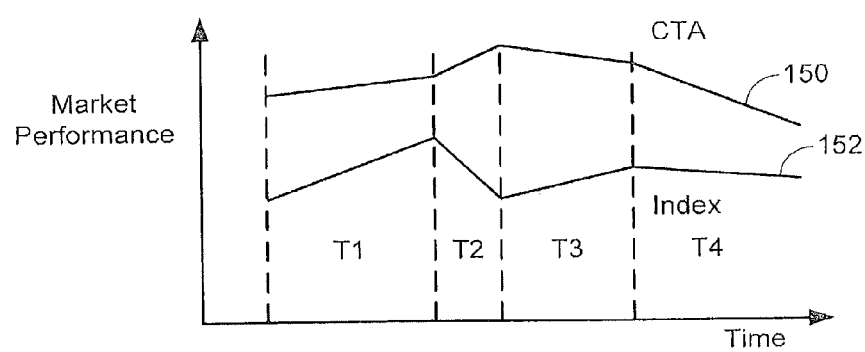
FIG. 7 is a graph illustrating uncorrelated first and second asset classes in a portable alpha investment instrument according to some embodiments of the present invention.

Brief reference is now made to FIG. 7, which is a graph illustrating uncorrelated first and second asset classes in a portable alpha investment instrument according to some embodiments of the present invention. As illustrated, the market performance of a CTA 150 may be uncorrelated relative to that of a composite index 152. For example, during the time periods defined as T1 and T4, the composite index and the CTA perform in the same general direction as one another. Note, however, that even though directionally similar during periods T1 and T4, they each exhibit different relative volatility. For example, during period T1, the composite index 152 includes a greater rate of change than the CTA 150. In contrast, during the T4, period, the CTA 150 includes a greater rate of change than the composite index 152. In contrast with periods T1 and T4, the CTA 150 and composite index 152 move in opposite directions relative to one another during periods T2 and T3. For example, during T2, the CTA 150 performs in a generally positive manner whereas the composite index 152 performs in a significantly negative manner. Further, during T3, the CTA 150 moves in a negative manner and the composite index 152 moves in a positive manner. Thus, the performances of the composite index 152 and the CTA 150 are substantially uncorrelated.

As will be appreciated by one of skill in the art, the present invention may be embodied as a method, system, business method and/or computer program product. Accordingly, the present invention may take the form of an entirely hardware embodiment, an entirely software embodiment or an embodiment combining software and hardware aspects, all generally referred to herein as a "circuit" or "module."

Embodiments according to the present invention are described with reference to block diagrams and/or operational illustrations of methods and communication terminals. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium include the following: hard disks, optical storage devices, magnetic storage devices, a portable computer diskette, a random access memory (RAM), a read-only memory (ROM), an erasable programmable read-only memory (EPROM or Flash memory), and a compact disc read-only memory (CD-ROM and/or DVD-ROM).

Computer program code for carrying out operations of the present invention may be written in an object oriented programming language such as Java®, Smalltalk or C++, a conventional procedural programming languages, such as the "C" programming language, or lower-level code, such as assembly language and/or microcode. Embodiments of the present invention, however, are not limited to any particular programming language. The program code may execute entirely on a single processor and/or across multiple processors, as a stand-alone software package or as part of another software package.

The computer program instructions may also be loaded onto a computer or other programmable data processor to cause a series of operational steps to be performed on the computer or other programmable processor to produce a computer implemented process such that the instructions which execute on the computer or other programmable processor provide steps for implementing the functions or acts specified in the flowchart and/or block diagram block or blocks.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A system for investing in multiple asset classes, comprising:
   a beta asset selector that is configured to select a beta asset class;
   an alpha asset selector that is configured to select an alpha asset class that is different from the beta asset class; and
   a term converter that is configured to convert a first term corresponding to the beta asset to a second term corresponding to the beta asset class,
   wherein at least one of the beta asset selector, the alpha asset selector and the term converter includes a hardware and/or computer software module.

2. The system of claim 1, wherein the alpha asset selector is configured to select the alpha asset class that comprises a negative market movement correlation relative to the beta asset class.

3. The system of claim 1, wherein the alpha asset selector is configured to select the alpha asset class that comprises uncorrelated market movement relative to the beta asset class.

4. The system of claim 1, wherein the beta asset class comprises a composite stock index and wherein the alpha asset class comprises managed futures and/or a commodity index corresponding to a plurality of time-value-based securities.

5. The system of claim 1, wherein the beta asset class comprises a RAFI index and the alpha asset class comprises a Commodity Trading Advisor fund.

6. The system of claim 1, wherein the term converter is further configured to establish a swap transaction of a first beta asset class return corresponding to the first term for a second beta asset class corresponding to the second term, wherein the first term is substantially shorter than the second term.

7. The system of claim 6, wherein the swap transaction comprises a rolling swap transaction, wherein the swap transaction further comprises a plurality of fractional swap transactions, and wherein any of the plurality of fractional swap transactions may be terminated prior to the contract term without affecting the other of the plurality of the fractional swap transactions.

8. The system of claim 1, wherein the term converter is further configured to convert a first term alpha asset class return corresponding to the first term to a second term alpha asset class corresponding to the second term, wherein the first term is substantially shorter than the second term.

9. The system of claim 1, wherein the second term is sufficiently long to cause a tax status change.

* * * * *